(12) United States Patent
Derichs (10) Patent No.: US 8,491,174 B2
(45) Date of Patent: Jul. 23, 2013

(54) LIGHT EMITTING ASSEMBLY

(75) Inventor: Kevin J. Derichs, Buda, TX (US)

(73) Assignee: Rambus Delaware LLC, Brecksville, OH (US)

(*) Notice: Subject to any disclaimer, the term of this patent is extended or adjusted under 35 U.S.C. 154(b) by 353 days.

(21) Appl. No.: 12/986,314

(22) Filed: Jan. 7, 2011

(65) Prior Publication Data

US 2011/0164434 A1 Jul. 7, 2011

Related U.S. Application Data

(60) Provisional application No. 61/923,149, filed on Jan. 7, 2010.

(51) Int. Cl.
*F21V 8/00* (2006.01)

(52) U.S. Cl.
USPC ............ 362/612; 362/616; 362/634; 362/633

(58) Field of Classification Search
USPC ............... 362/612, 616, 632, 633, 634, 97.3, 362/23.09, 23.1, 23.17; 385/129–132; 349/58, 349/62, 65
See application file for complete search history.

(56) References Cited

U.S. PATENT DOCUMENTS

| | | | |
|---|---|---|---|
| 7,616,271 B2 * | 11/2009 | Souk et al. | 349/65 |
| 2008/0252818 A1 * | 10/2008 | Wu et al. | 349/65 |
| 2010/0328362 A1 * | 12/2010 | Song | 345/690 |
| 2011/0115696 A1 * | 5/2011 | Pankaj et al. | 345/102 |

* cited by examiner

*Primary Examiner* — Bao Q Truong
(74) *Attorney, Agent, or Firm* — Renner, Otto, Boisselle & Sklar, LLP

(57) ABSTRACT

A light emitting assembly comprises first and second segmented light guide structures. The first segmented light guide structure comprises first light guide elements physically connected at one end to a first common backbone member. The second segmented light guide structure comprises second light guide elements physically connected at one end to a second common backbone member. The common backbone members define a fixed separation between adjacent ones of the light guide elements. LED light sources are positioned adjacent the common backbone members such that each of the light guide elements receives light from at least one of the LED light sources. The first segmented light guide structure and the second segmented light guide structure are arranged with the first light guide elements interdigitated with the second light guide elements, with sufficient separation between the first light guide elements and between the second light guide elements to provide air gap boundaries between adjacent first and second light guide elements to reduce the amount of light cross talk therebetween and to form a substantially contiguous light emitting surface.

9 Claims, 10 Drawing Sheets

LIGHT EMITTING ASSEMBLY

CROSS-REFERENCE TO RELATED APPLICATIONS

This application claims the benefit of U.S. Provisional Application No. 61/293,149, filed Jan. 7, 2010, the entire disclosure of which is incorporated herein by reference.

BACKGROUND

Many known flat panel displays use a planar edge-lit backlight/light emitting assembly in which the light from one or more light sources is injected into the backlight (either using white light or cycling through individual red, green, blue (RGB) colors) and is shared by all pixels in a display during a light emission cycle. While the light is ON, pixels emit light either through selected optical pathways via a twist of liquid crystals (as in an LCD) or through a light valve structure in a Micro-opto-electromechanical systems (MOEMS) panel (opaquing shutters or Frustrated Total Internal Reflection (FTIR) light extraction mechanisms). During the same time the ON pixels are emitting light, the OFF pixels will also be in the glow of the backlight thereby reducing the contrast ratio.

Some known flat panel display systems utilize segmented backlights/light emitting assemblies 150 that are specifically designed to turn off a portion of the backlight behind blocks of rows of pixels. Such display systems require individual electronic controls, light sources 152a-e and waveguides for each block 101a-j (see FIGS. 1A and 1B). Loading data for only the row blocks that have the light source ON insures that the row blocks with the light sources OFF will be dark, increasing the contrast ratio but reducing the total average output of light.

Figure 1A:
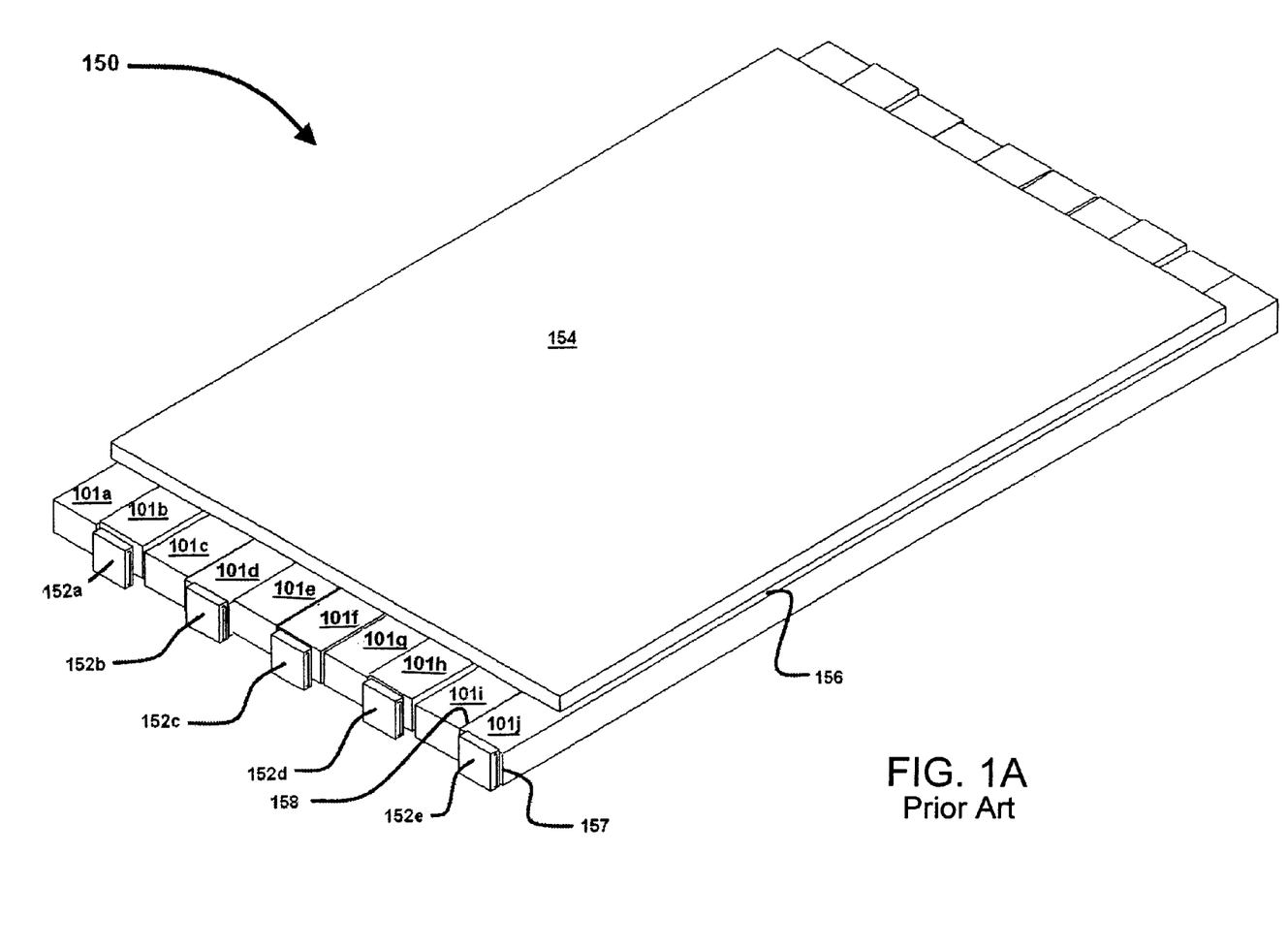
FIG. 1A is a schematic perspective view of a prior art optical panel display and associated backlight/light emitting assembly comprised of a plurality of edge-lit light guide elements.
Figures 1B, 2A:
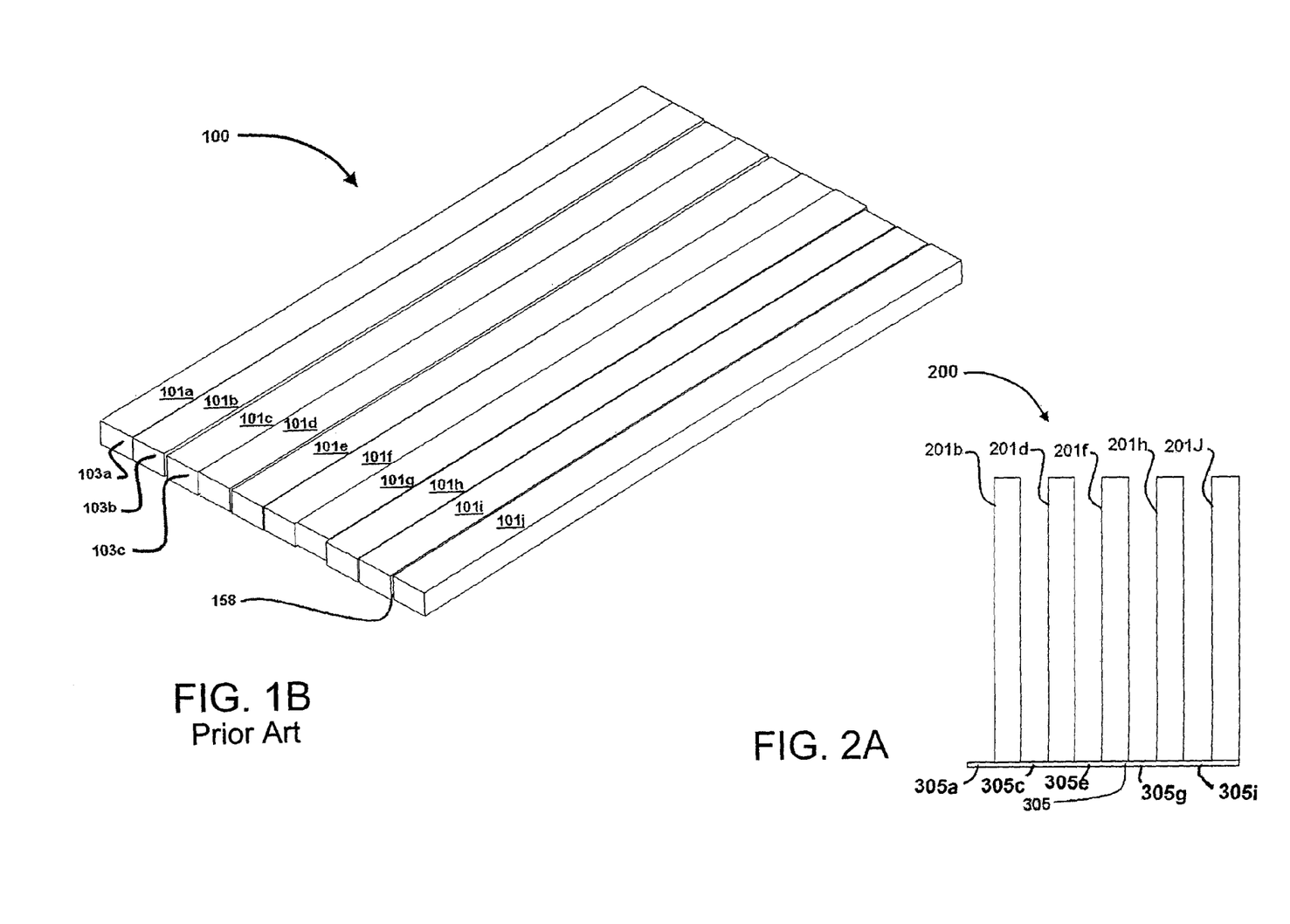
FIG. 1B is a schematic perspective view of the light guide elements of FIG. 1A.
FIG. 2A is a schematic top plan view of a first segmented light guide structure of one interdigitated light emitting assembly embodiment of the present invention.

When a backlight is divided into multiple elements, the alignment of the individual backlight blocks becomes a mechanical assembly issue. First the alignment of each block 101a -j needs to be maintained in tight physical alignment with the light injection faces 157 of the respective LED light sources 152a-e, while maintaining tight physical alignment of the top surface 156 with the LCD or MOEMS panel 154 for light injection into the defined active display area of the panel associated with each block. In addition, it is important to maintain individual alignment of the adjoining side wall faces 158 between the neighboring adjacent blocks 101a -j to limit the amount of light cross talk between the individual blocks.

With individual backlight elements, each block would need its own XYZ alignment and fastening constraints, which would change the total internal reflection (TIR) light to FTIR light and cause the backlight/light emitting assembly to glow, decreasing the contrast ratio.

DETAILED DESCRIPTION

A light emitting assembly in accordance with embodiments of the present invention comprises individual segmented light guide elements that are interdigitated in such a way that the assembly can be predesigned for uniformity and enhanced brightness. In a typical application, the light emitting assembly constitutes part of the back light of a display. Such light emitting assembly has fewer mounting contact points than a conventional light emitting assembly, which reduces the overall loss of TIR light due to mounting contacts. Also insuring only TIR light within the backlight area allows for the individual light guide elements to be placed adjacent to one another in a tightly packed configuration. With the TIR trapping of the light within each individual light guide element, multiple different wavelengths (colors) can be injected into adjacent light guide elements at the same time, and due to the light not being able to exit the light guide element and jump over the air gap boundary between adjacent light guide elements, cross-talk can be held to a minimum. Also restricting the TIR light of each light guide element to mixing only within each light guide element insures that the light at the extraction surface of each light guide element is uniform and wavelength specific with little or no cross contamination of wavelengths between adjacent light guide elements.

In accordance with one aspect of the invention, the light emitting assembly comprises first and second segmented light guide structures. The first segmented light guide structure comprises first light guide elements that are physically connected at one end to a first common backbone member that maintains a fixed separation between adjacent ones of the first light guide elements. The second segmented light guide structure comprises second light guide elements that are physically connected at one end to a second common backbone member that maintains a fixed separation between adjacent ones of the second light guide elements. The light emitting assembly additionally comprises LED light sources positioned adjacent the common backbone members such that each of the light guide elements receives light from at least one of the LED light sources. The first segmented light guide structure and the second segmented light guide structure are arranged with the first light guide elements interdigitated with and contacting the second light guide elements to form a substantially continuous light emitting surface.

Referring now in detail to the drawings, and initially to FIG. 2A, there is schematically shown an example of a first segmented light guide structure 200 of one interdigitated light emitting assembly in accordance with an embodiment of the invention. Light guide structure 200 comprises individual light guide elements 201$b$, $d$, $f$, $h$ and $j$ disposed parallel to one another. Each of these light guide elements is physically connected at one end to a common backbone member 305 that defines a fixed separation between adjacent ones of light guide elements 201$b$, $d$, $f$, $h$ and $j$. The separation between the adjacent ones of light guide elements 201$b$, $d$, $f$, $h$ and $j$ defines regions 305$a$, $c$, $e$, $g$ and $i$ located at one end of and between adjacent ones of the light guide elements 201$b$, $d$, $f$, $h$ and $j$. Light guide elements 201$b$, $d$, $f$, $h$ and $j$ align the light guide elements of a second segmented light guide structure when the light guide elements of the second segmented light guide structure are interdigitated with the light guide elements of the first light guide structure, as will be described below.

Figure 2B:
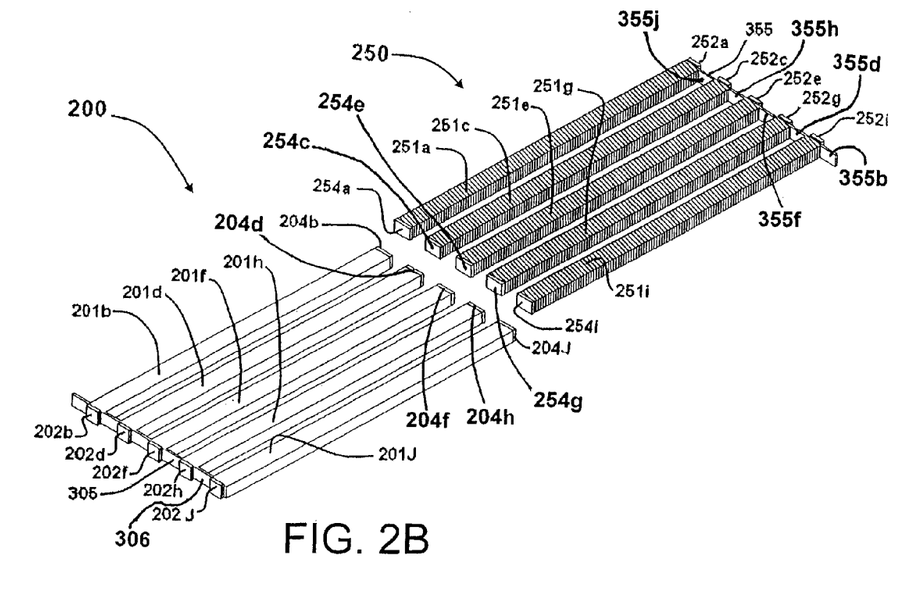
FIG. 2B is a schematic perspective view of the first segmented light guide structure of FIG. 2A and a second segmented light guide structure which when interdigitated with one another form one backlight/light emitting assembly embodiment of the present invention.

FIG. 2B shows the first segmented light guide structure 200 of FIG. 2A and a second segmented light guide structure 250. Second segmented light guide structure 250 comprises individual light guide elements 251$a$, $c$, $e$, $g$ and $i$ disposed parallel to one another. Each of these light guide elements is physically connected at one end to a common backbone member 355 that defines a fixed separation between adjacent ones of light guide elements 251$a$, $c$, $e$, $g$ and $i$. The separation between the adjacent ones of light guide elements 251$a$, $c$, $e$, $g$ and $i$ of the second light guide structure 250 defines regions 355$b$, $d$, $f$, $h$ and $j$ at one end of and between adjacent ones of light guide elements 251$a$, $c$, $e$, $g$ and $i$ of the second light guide structure 250. This separation between light guide elements 251$a$, $c$, $e$, $g$ and $i$ and between light guide elements 201$b$, $d$, $f$, $h$ and $j$ is sufficient to provide air gap boundaries between the light guide elements 201$b$, $d$, $f$, $h$ and $j$ of first light guide structure 200 and the light guide elements 251$a$, $c$, $e$, $g$ and $i$ of second backlight structure 250 when the light guide elements are interdigitated to form a light emitting assembly as described below.

In an example, first light guide structure 200 is fabricated by attaching the ends of light guide elements 201$b$, $d$, $f$, $h$ and $j$ to backbone member 305 using a suitable adhesive or a mechanical fixings. A jig may be used to define the relative positions of the light guide elements and the position of the light guide elements relative to the backbone member. In another example, light guide elements 201$b$, $d$, $f$, $h$ and $j$ and backbone member 305 are molded as an integral unit. In this case, the mold defines the relative positions of the light guide elements and the position of the light guide elements relative to the backbone member. Other fabrication techniques are possible and may be used. Second light guide structure 250 is similarly fabricated.

Figure 3:
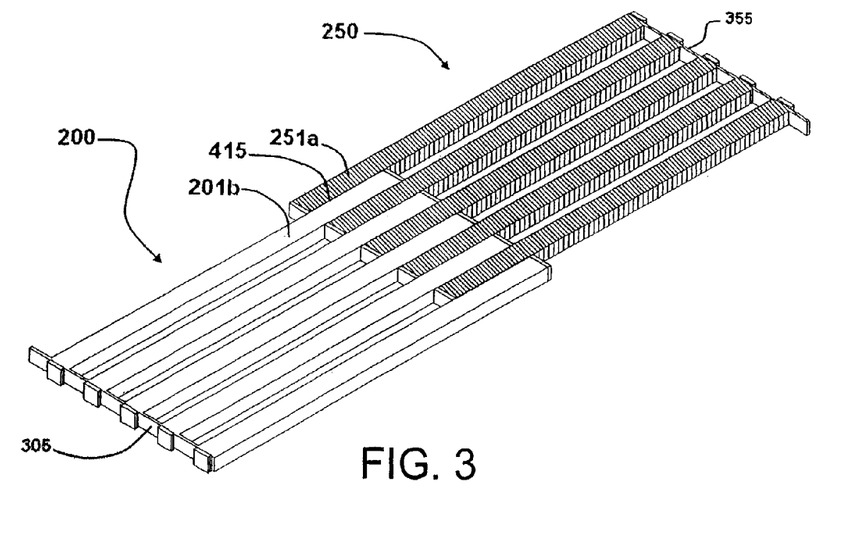
FIG. 3 is a schematic perspective view of the two segmented light guide structures of FIG. 2B partially interdigitated with one another.
Figure 4:
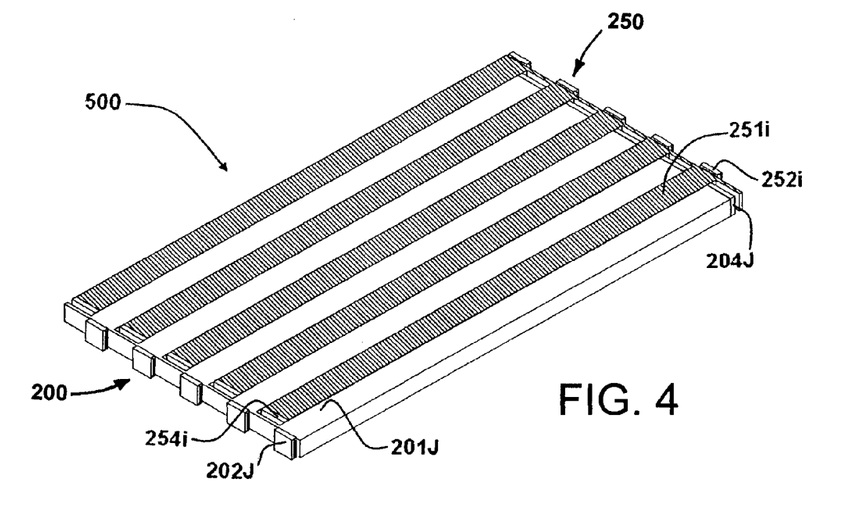
FIG. 4 is a schematic perspective view of the two segmented light guide structures of FIG. 2B fully interdigitated with one another to form the one interdigitated backlight/light emitting assembly of the present invention.

FIG. 3 shows the first and second segmented light guide structures 200 and 250 of FIG. 2B with their respective light guide elements partially interdigitated. FIG. 4 shows the first and second segmented light guide structures 200 and 250 of FIG. 2B with their respective light guide elements fully interdigitated to provide a planar edge-lit light emitting assembly 500 in accordance with an embodiment of the invention. Light emitting assembly 500 is for emitting light, for example into an optical display panel including, but not limited to, an LCD or MOEMS panel.

FIG. 2B shows LED light sources 202$b$, $d$, $f$, $h$ and $j$ flush mounted against the flat outer surface 306 of the common backbone member 305. Each of the light sources is located in line with a respective one of the light guide elements 201$b$, $d$, $f$, $h$ and $j$ of the first segmented light guide structure 200 to inject light into the respective light guide element in such a manner that the light is transmitted along the light guide element by total internal reflection as TIR light.

FIG. 2B also shows LED light sources 252$a$, $c$, $f$, $g$ and $i$ flush mounted against the flat outer surface of the common backbone member 355. Each of the light sources is located in line with a respective one of the light guide elements 251$a$, $c$, $e$, $g$ and $i$ f the second segmented light guide structure 250 to inject light into the respective individual light guide element in such a manner that the light is transmitted along the light guide element by total internal reflection as TIR light.

FIG. 2B also shows mirrored end surfaces 204$b$, $d$, $f$, $h$ and $j$ located at the ends of the light guide elements 201$b$, $d$, $f$, $h$ and $j$ remote from LED light sources 202$b$, $d$, $f$, $h$ and $j$, and mirrored end surfaces 254$a$, $c$, $e$, $g$ and $i$ located at the ends of the light guide elements 251$a$, $c$, $e$, $g$ and $i$ remote from LED light sources 252$a$, $c$, $f$, $g$ and $i$. The mirrored end surfaces recycle the TIR light within the respective light guide elements.

Figure 13:
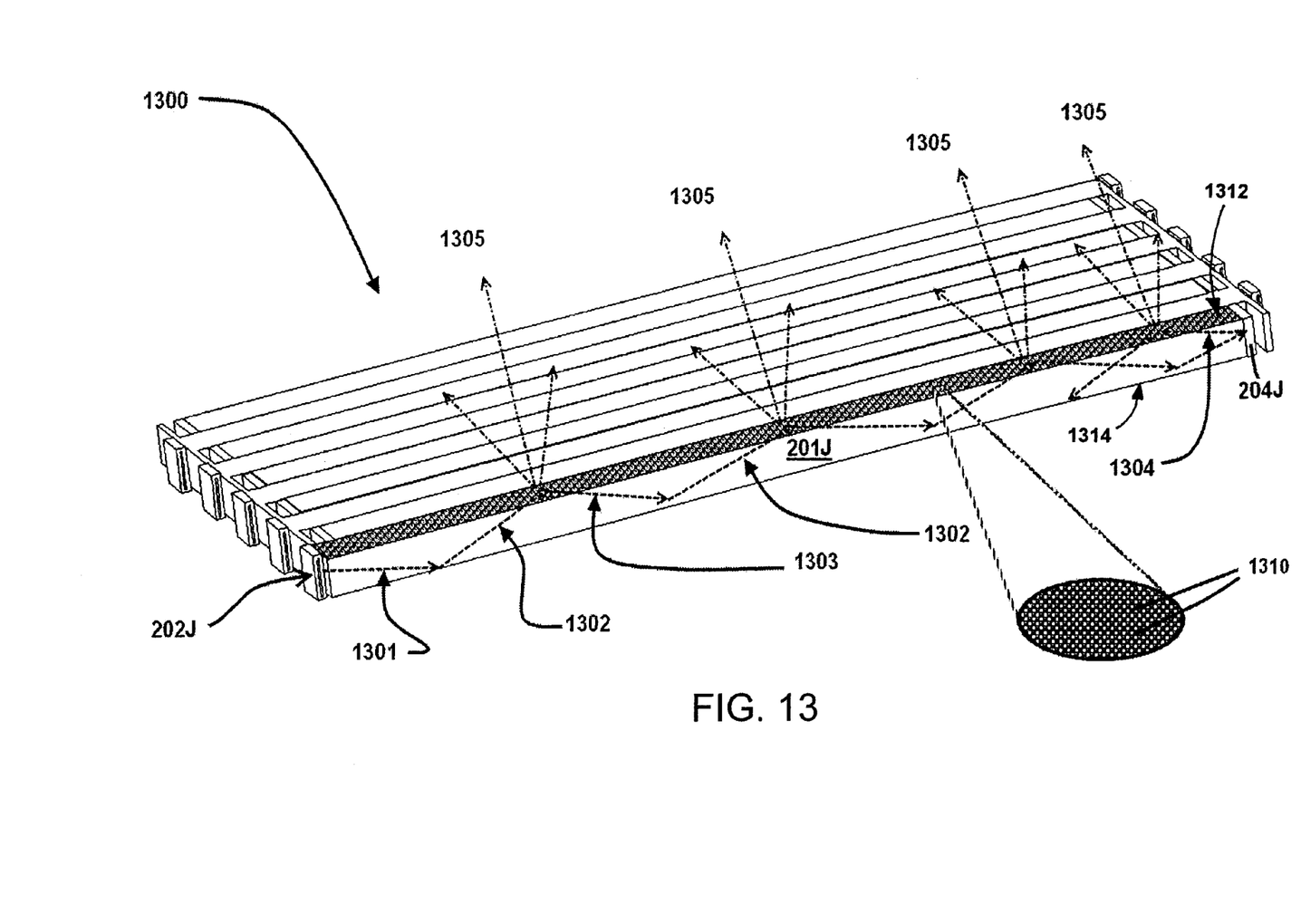
FIG. 13 is a schematic perspective view of an interdigitated backlight/light emitting assembly of the present invention schematically showing light extraction features or elements on or in the top surface of one of the light guide elements and both TIR of light rays within the one light guide element as well as emission of light rays therefrom.

As schematically shown in FIG. 13, as the TIR light 1301 traverses the length of, for example, the light guide element 201$j$, the TIR light will either strike a light extraction feature 1310 on or in, for example, a surface 1312 of the light guide element, and be output as extracted light 1305, or will not strike a light extraction feature and be reflected by surface 1312 as reflected light 1303. The reflected light continues to travel as TIR light along the length of the light guide element and, if not extracted by an encounter with another light extraction feature, reflects off the mirrored end surface 204$j$. After reflection, the TIR light recycles back through the light guide element, reflecting off the surfaces 1312, 1314 of the light guide element, until the light finally hits an extraction feature 1310 and is extracted as extracted light 1305, or is absorbed.

In the example shown in FIG. 13, light extraction features 1310 are only shown on or in the surface 1312 of the light guide element 201*j*. In other examples (not shown), such light extraction features are on or in the surface 1312 and/or on or in the surface 1314, opposite surface 1312, of any of the light guide elements, as desired.

Figure 5:
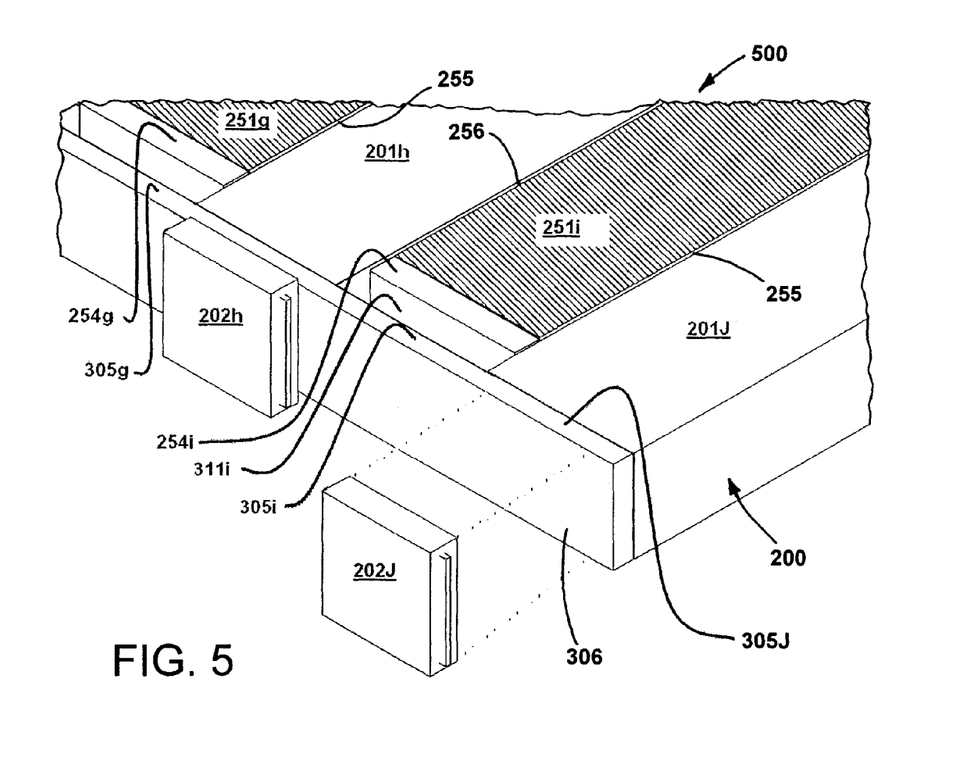
FIG. 5 is an enlarged schematic fragmentary perspective view of the left end of the interdigitated backlight/light emitting assembly of FIG. 4 showing one of the LED light sources in an exploded view away from one of the segmented light guide structures.

FIG. 5 is an enlarged schematic perspective view of part of one end of the interdigitated light emitting assembly 500 of FIG. 4. FIG. 5 shows one of the LEDs light sources 202*j* exploded away from the common backbone member 305 of segmented light guide structure 200. This better illustrates the flat outer surface 306 of the common backbone member 305 on which the LED light sources are flush mounted in tight physical alignment with the individual light guide elements of segmented light guide structure 200. The LED light sources mounted on the common backbone member 355 of light guide structure 250 are similarly mounted. FIG. 5 also shows one of the air gaps 311 i that is maintained between the inner surface of the common backbone member 305 of the segmented light guide structure 200 and the mirrored end surfaces of the light guide elements 251 g and 251*i* of the other segmented light guide structure 250 (FIG. 2B).

The common backbone members of the respective segmented light guide structures 200, 250 also maintain individual alignment of the light guide elements of each respective light guide structure between the adjacent light guide elements of the other light guide structure, with sufficient separation between the first light guide elements and between the second light guide elements to provide air gap boundaries 255 and 256 between adjacent light guide elements 201 and 251 (see FIG. 5) to reduce the amount of light cross talk between the individual light guide elements and to form a substantially continuous light emitting surface for light output from the interdigitated light emitting assembly into a defined active display area of an optical display panel associated with each light guide element.

Although each of the segmented light guide structures 200 and 250 of the interdigitated light emitting assembly 500 shown in FIGS. 3-5 includes five light guide elements, the number of light guide elements in each light guide structure may be varied as desired, as may the length, width, and thickness of the light guide elements.

Figure 6:
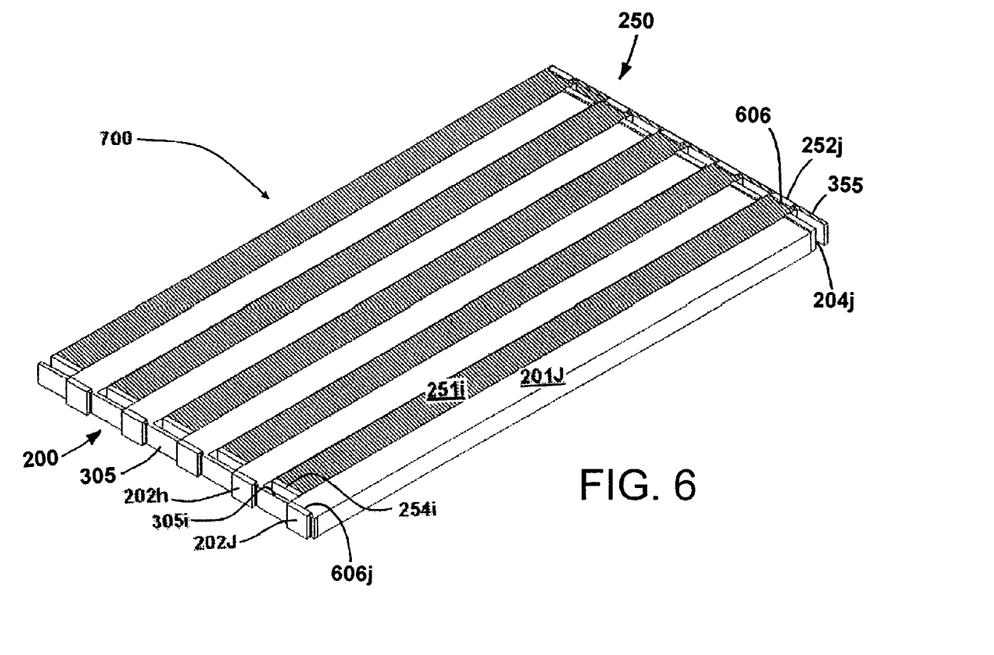
FIG. 6 is a schematic perspective view of another interdigitated backlight/light emitting assembly embodiment of the present invention.
Figure 7:
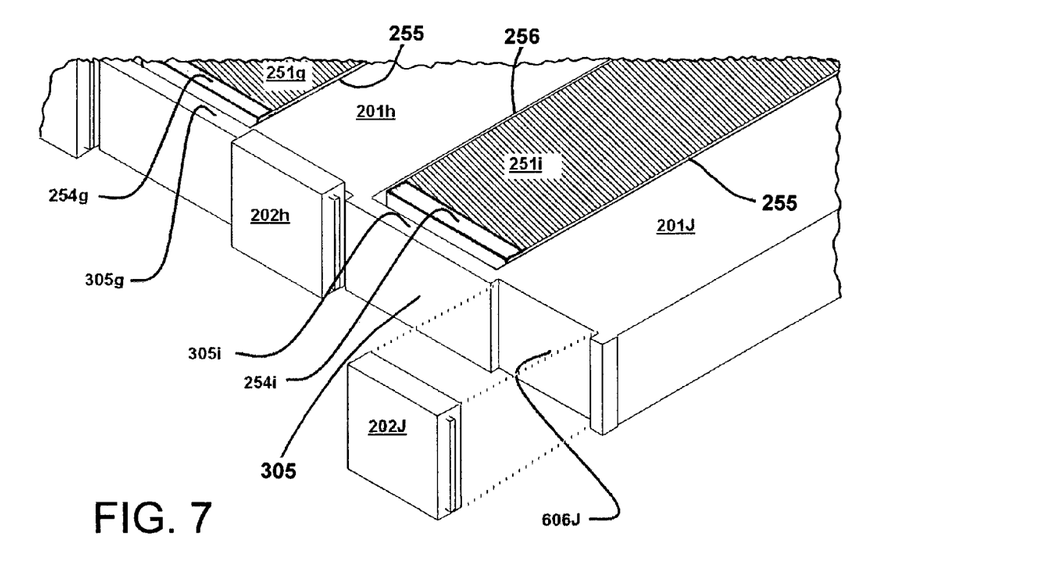
FIG. 7 is an enlarged schematic fragmentary perspective view of the left end of the interdigitated backlight/light emitting assembly of FIG. 6 showing one of the LED light sources exploded away from one of the segmented light guide structures of that particular embodiment.

FIGS. 6 and 7 show an example of another interdigitated light emitting assembly 700 in accordance with an embodiment of the invention. The example shown in FIGS. 6 and 7 is substantially similar to the embodiment 500 described above with reference to FIGS. 3-5, but differs in that recesses 606 are defined in the common backbone members 305, 355 of the respective first and second segmented light guide structures 200, 250 to facilitate alignment of the LED light sources 202 and 252 to the respective light guide elements.

As best seen in FIG. 7, for each light guide element (for example, light guide element 201*j*), a light source 202*j* is placed into a recess 606*j* defined in the common backbone member 305 to positively align the LED light source with respect to the respective light guide element 201*j*. Light source 202*j* provides TIR light to light guide element 201*j*. The TIR light travels the length of light guide element 201*j* until extracted by a light extraction feature 1310 and/or until it is redirected back within light guide element 201*j* by mirrored end surface 204*j* located at the end of the light guide element 201*j* (FIG. 2B) remote from the LED light source, in the manner described above with reference to FIG. 13.

Figure 8:
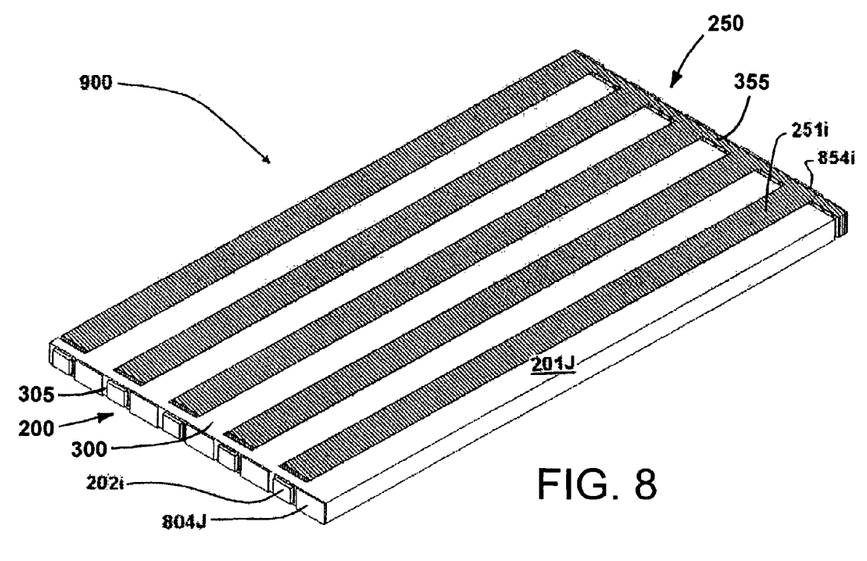
FIG. 8 is a schematic perspective view of another interdigitated backlight/light emitting assembly embodiment of the present invention.
Figure 9:
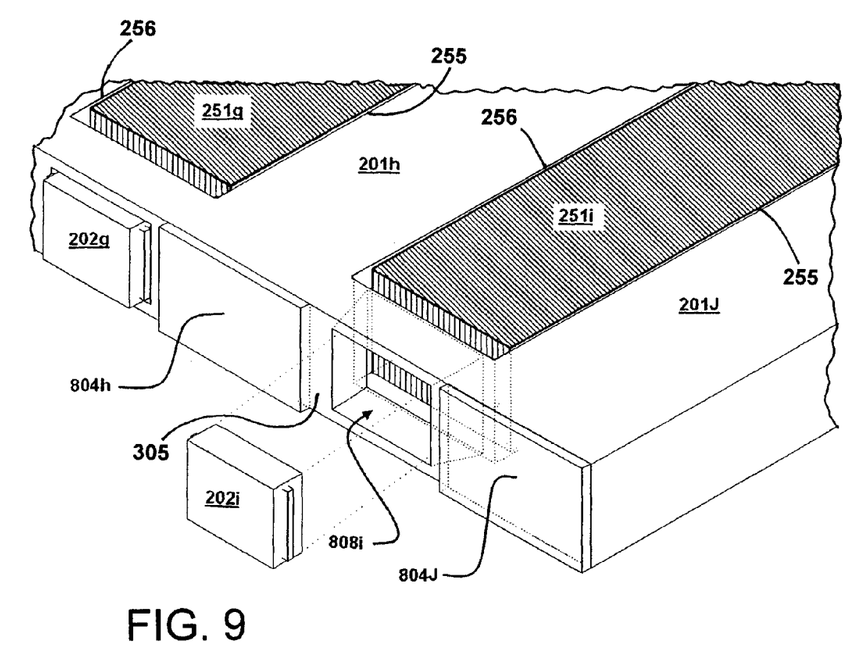
FIG. 9 is an enlarged schematic fragmentary perspective view of the left end of the interdigitated backlight/light emitting assembly of FIG. 8 showing one of the LED light sources exploded away from one of the integrated light guide structures of that particular embodiment.

FIGS. 8 and 9 show an example of another interdigitated light emitting assembly 900 in accordance with an embodiment of the invention. The example shown in FIGS. 8 and 9 is substantially similar to the embodiments described above, but differs in that mounting holes defined in the backbone members 305, 355 of the respective segmented light guide structures 200, 250 extend through the backbone members in line with the ends of the light guide elements of the other segmented light guide structure 250, 200 remote from the backbone member 355, 305 thereof. The mounting holes provide positive alignment of the LED light sources 202 and 252 with respect to the ends of the light guide elements remote from the respective backbone member.

FIG. 9 shows mounting holes 808*i* defined in the backbone member 305 of the segmented light guide structure 200. Mounting hole 808*i* is located in line with the end of the light guide element 251*i* of the other segmented light guide structure 250 remote from the backbone member 355 of light guide structure 250. Mounting hole 808*i* provides positive alignment of the LED light source 202*i* with respect to the light guide element 251 i. In this embodiment, mirrored end surfaces are provided on the flat outer surfaces of the common backbone members 305, 355 in line with the light guide elements of the respective segmented light guide structures instead of on the ends of the light guide elements of the respective segmented light guide structures remote from the LED light sources. In the example shown, a mirrored end surface 854*i* is located on the outer surface of backbone member 355 in line with light guide element 251 i and a mirrored end surface 804*j* is located on the outer surface of backbone member 305 in line with light guide element 201*j*. Light from the respective light sources, for example, light source 202*i*, provides TIR light to light guide element 251*i*. Such TIR light travels the length of the light guide element 251*i* until either extracted by a light extraction feature or reflected off the mirrored end surface 804 located on backbone member 355 and recycled back within the light guide element 251 i until the light is finally extracted or absorbed.

Figure 10:
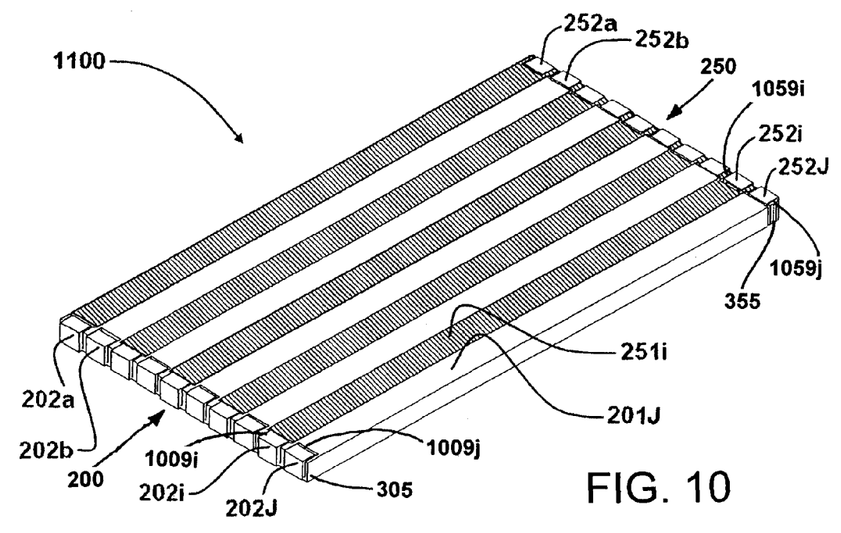
FIG. 10 is a schematic perspective view of another interdigitated backlight/light emitting assembly embodiment of the present invention.
Figure 11A:
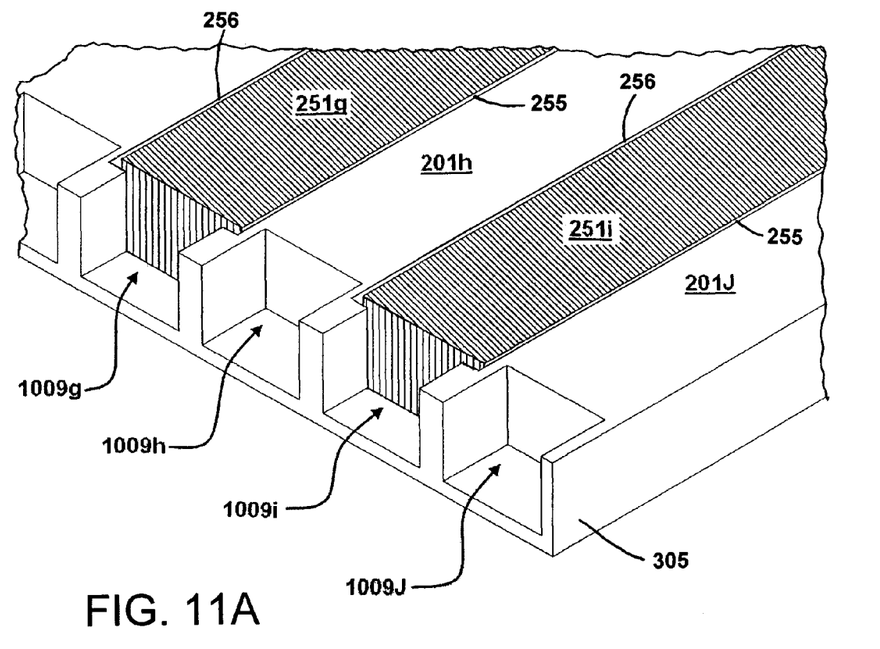
FIG. 11A is an enlarged schematic fragmentary perspective view of the left end of the interdigitated backlight/light emitting assembly of FIG. 10 but with the LED light sources omitted.
Figure 11B:
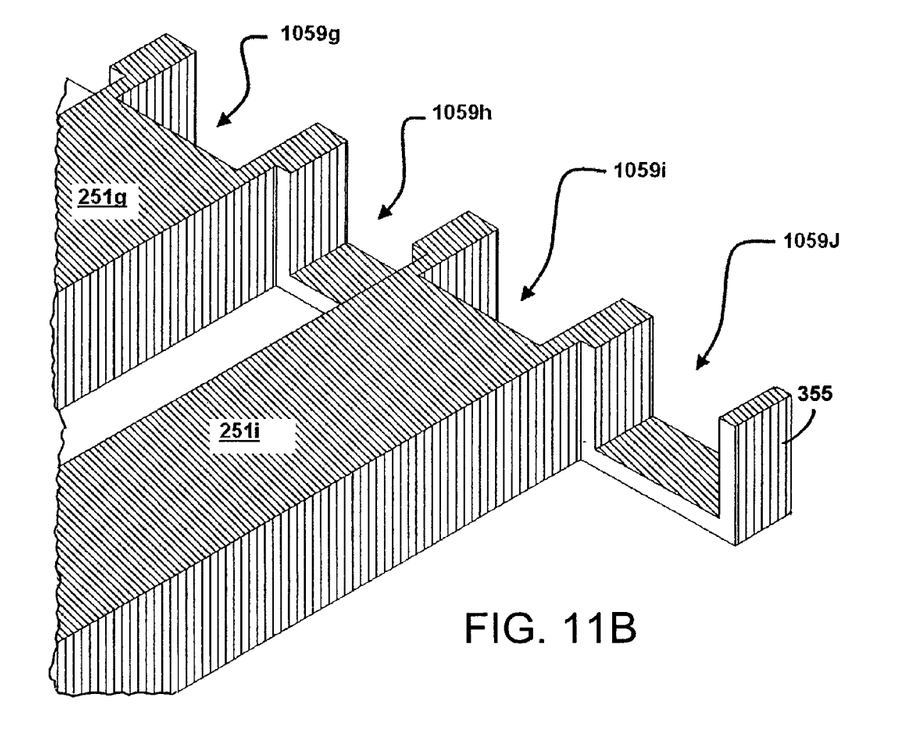
FIG. 11B is an enlarged schematic fragmentary perspective view of the right end of the right most segmented light guide structure of the interdigitated backlight/light emitting assembly of FIG. 10 with the LED light sources omitted.

FIGS. 10, 11*a* and 11*b* show an example of another interdigitated light emitting assembly 1100 in accordance with an embodiment of the invention. The example shown in these figures is substantially similar to the embodiments described above, but differs in that mounting recesses and trenches are defined in each backbone member 305, 355 of the respective segmented light guide structure 200, 250 to facilitate alignment of LED light sources with both ends of each of the light guide elements. FIG. 11A shows mounting recesses 1009*h* and j and trenches 1009*g* and *i* defined in backbone member 305. FIG. 11B shows mounting recesses 1059*g* and i and trenches 1059*h* and *j* defined in backbone member 355. Also as shown in FIG. 10, for each light guide element, for example light guide element 201*j*, a light source 202*j* is mounted in a mounting recess 1009*j* in backbone member 305 and a second light source 252*j* is mounted in a mounting trench 1059*j* in the backbone member 355 to positively align the light sources 202*j* and 252*j* with both ends of the light guide element 201*j*.

In this embodiment, there is no mirror on either end of any of the light guide elements. TIR light from both light sources is injected into both ends of each of the individual light guide elements and travels in opposite directions along the length of the respective light guide elements until extracted by encountering one or more light extraction features. The light that is not extracted will be absorbed or reflected by the light sources at both ends of the respective light guide elements.

Figure 12:
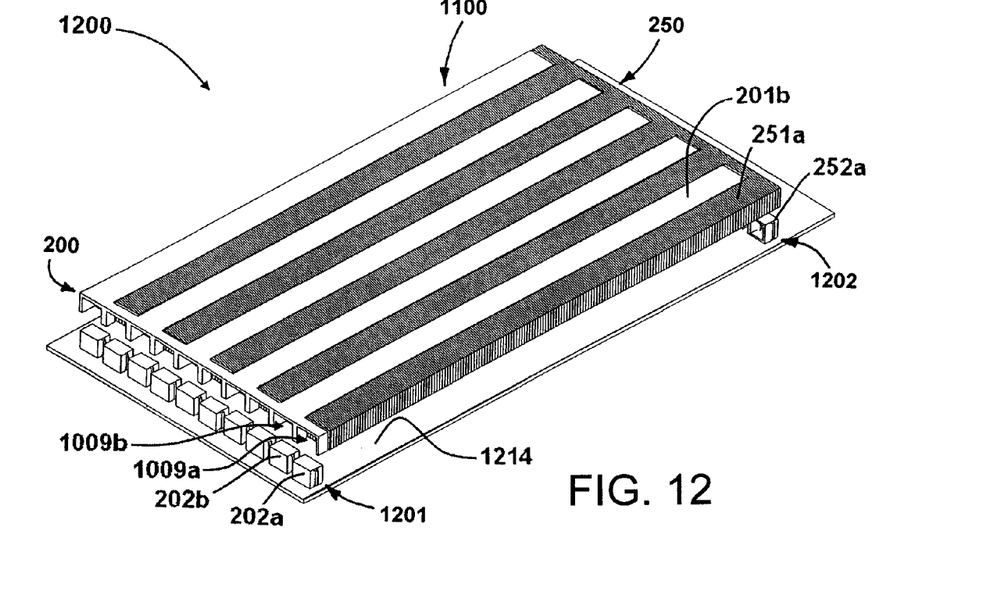
FIG. 12 is a schematic perspective view of the interdigitated backlight/light emitting assembly embodiment of FIG. 10 flipped over for vertical placement onto two rows of individual LED light sources mounted on a circuit board.

The interdigitated light emitting assembly 1100 of FIG. 10 facilitates assembly of the respective segmented light guide structures with fixed (i.e., non-adjustable) light sources. For example, FIG. 12 shows a LED lighting system 1200 composed of individual LEDs 202 and 252 arranged in two rows 1201 and 1202 and mounted on a circuit board 1214. Lighting system 1200 is additionally composed of an embodiment of the interdigitated light emitting assembly 1100 of FIG. 10 flipped over and placed on the two rows of LEDs. In this case, the length dimension of the interdigitated backlight assembly 1100 is made slightly less than the distance between the two rows 1201 and 1202 of LEDs so that the first and second segmented light guide structures 200 and 250 can be slightly expanded (L e., slightly slid apart in the lengthwise direction) until the backlight structure 200 abuts against row 1201 of LEDs and the backlight structure 250 abuts against row 1202 of LEDs. This facilitates aligning the backlight structures 200 and 250 with the LEDs in each row during manufacture of the backlight assembly.

Figure 14A:
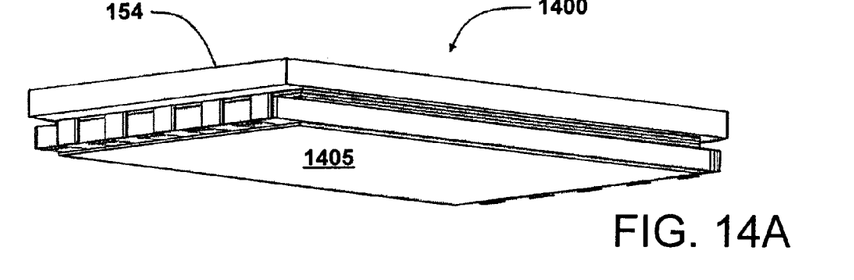
FIG. 14A is a schematic perspective bottom view of an optical panel display disposed adjacent any of the interdigitated backlight/light emitting assemblies of the present invention.
Figure 14B:
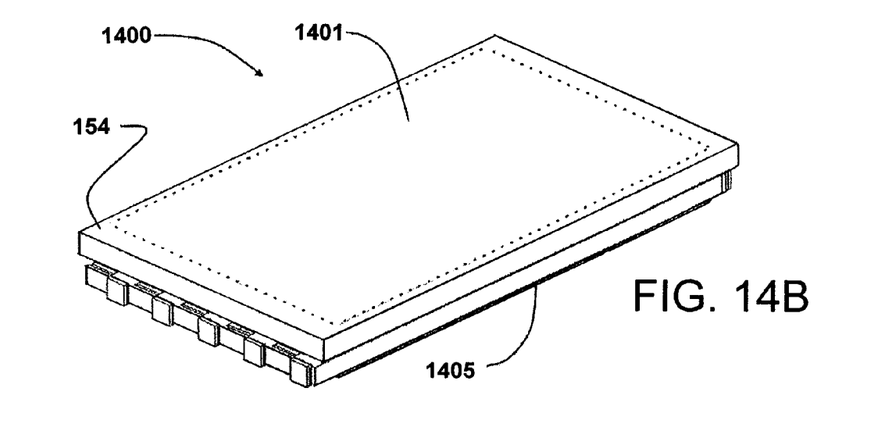
FIG. 14B is a schematic perspective top view of the optical panel display and the interdigitated backlight/light emitting assembly of FIG. 14A.
Figure 14C:
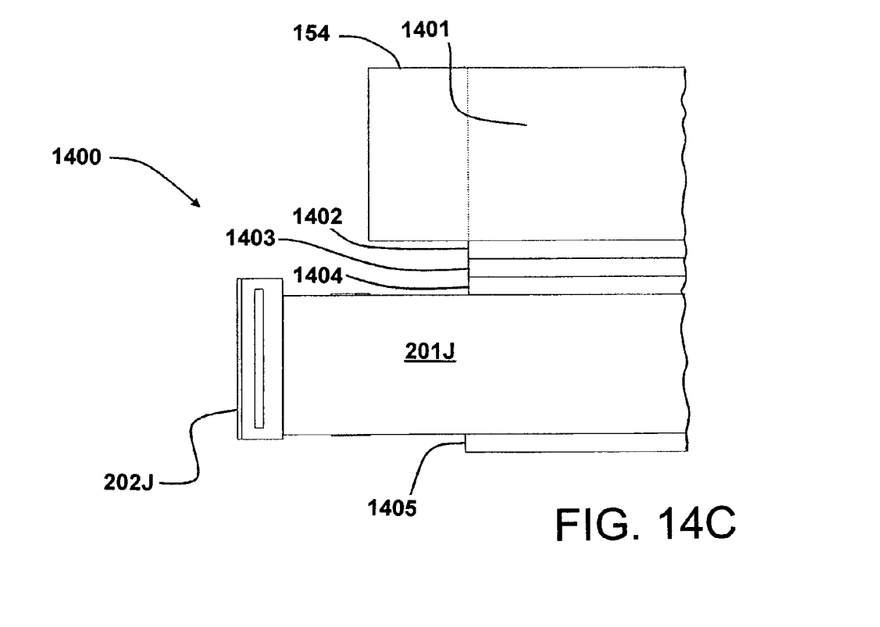
FIG. 14C is an enlarged schematic side view of the optical panel display and interdigitated backlight/light emitting assembly of FIGS. 14A and 14B.

Various light extraction features and/or enhancement films of various types may be utilized with any of the interdigitated light emitting assemblies described above. For example, enhancement films of various types may be interposed between an optical display panel and any of the interdigitated light emitting assemblies described above. FIGS. 14A-C show several different enhancement films that may be used to modify the properties of the light emitted by a light emitting assembly 1405 before the light enters an optical display panel 154 such as an LCD or MOEMS panel. In an example, one film is a light polarization recycling film 1402 (see FIG. 14C). Such polarization recycling film increases the intensity of the light available for illuminating the display panel 154 by recycling light that may otherwise be absorbed by a rear polarizer of the display panel. Another film may be a light viewing angle shaping film or a film 1403 for changing the propagation direction of light towards the normal to the display panel before the light is input to the panel. Still another film 1404 comprising light extracting features or elements may be disposed on one or more of the surfaces of any of the light guide elements parallel to the display panel. One such film 1404 is illustrated in FIG. 14C disposed on a surface of light guide element 201j facing display panel 154. Further, a specular or diffuse reflector film 1405 may be used to recycle the non-TIR light that exits the surface of the light guide elements remote from the display panel. The placement and surface area coverage of any of these films may extend over the size and shape of an active area 1401 of the display panel 154 (see FIGS. 14B and 14C).

Light extracting features may also be provided on or in a surface of any of the light guide elements as illustrated by the light extraction features 1310 located on the surface 1312 of the light guide element 201j in FIG. 13. Also as described above, although the light extraction features 1310 are illustrated in FIG. 13 as only being on or in the surface 1312 of one light guide element 201j, such light extraction features may be present on or in one or both major surfaces of any of the light guide elements as desired.

This disclosure describes the invention in detail using illustrative embodiments.

However, it is to be understood that the invention defined by the appended claims is not limited to the precise embodiments described.

What is claimed is:

1. A light emitting assembly, comprising:
   a first segmented light guide structure, comprising first light guide elements physically connected to a first common backbone member, the first common backbone member defining a fixed separation between adjacent ones of the first light guide elements;
   a second segmented light guide structure, comprising second light guide elements physically connected to a second common backbone member, the second common backbone member defining a fixed separation between adjacent ones of the second light guide elements; and
   LED light sources positioned adjacent the common backbone members such that each of the light guide elements receives light from at least one of the LED light sources, wherein the first segmented light guide structure and the second segmented light guide structure are arranged with the first light guide elements interdigitated with the second light guide elements to form a substantially continuous light emitting surface.

2. The light emitting assembly of claim 1, wherein each of the light guide elements comprises a pattern of light extracting optical features for extracting light from a light emitting surface of each of the light guide elements.

3. The light emitting assembly of clam 1, wherein the respective LED light sources are mounted to the respective common backbone members of the first and second segmented light guide structures.

4. The light emitting assembly of claim 1, wherein the respective common backbone members define recesses for accommodating or mounting of the respective LED light sources.

5. The light emitting assembly of claim 1, wherein the respective common backbone members define holes for accommodating or mounting of the respective LED light sources.

6. The light emitting assembly of claim 1, wherein the respective common backbone members define recesses and trenches for accommodating or mounting of the respective LED light sources.

7. The light emitting assembly of claim 1, wherein the LED light sources are mounted to a circuit board.

8. The light emitting assembly of claim 1, wherein there is sufficient separation between the first light guide elements and between the second light guide elements to provide air gap boundaries between adjacent first and second light guide elements to reduce light cross talk therebetween.

9. The light emitting assembly of claim 1, additionally comprising a film having light extracting optical elements, the film being disposed on the light emitting surface of the light emitting assembly.

\* \* \* \* \*